(12) United States Patent
Holmes

(10) Patent No.: US 6,881,964 B2
(45) Date of Patent: Apr. 19, 2005

(54) INTEGRAL FILTER SUPPORT AND SHUTTER STOP FOR UV CURING SYSTEM

(75) Inventor: Mark Holmes, Waterford, CT (US)

(73) Assignee: Henkel Corporation, Rocky Hill, CT (US)

(*) Notice: Subject to any disclaimer, the term of this patent is extended or adjusted under 35 U.S.C. 154(b) by 43 days.

(21) Appl. No.: 10/468,819

(22) PCT Filed: Feb. 25, 2002

(86) PCT No.: PCT/US02/05813
§ 371 (c)(1),
(2), (4) Date: Aug. 25, 2003

(87) PCT Pub. No.: WO02/071009
PCT Pub. Date: Sep. 12, 2002

(65) Prior Publication Data
US 2004/0094727 A1 May 20, 2004

Related U.S. Application Data
(60) Provisional application No. 60/272,523, filed on Mar. 1, 2001.

(51) Int. Cl.$^7$ ................................................ A61N 5/00
(52) U.S. Cl. ................................ 250/492.1; 250/504 R
(58) Field of Search ........................... 250/492.1, 504 R, 250/455.11, 454.11

(56) References Cited
U.S. PATENT DOCUMENTS 5,521,392 A    5/1996  Kennedy et al. ......... 250/492.1
5,803,729 A    9/1998  Tsimerman .................. 433/29
5,843,143 A   12/1998  Whitehurst ................... 607/88
5,905,268 A    5/1999  Garcia et al. ............... 250/504
6,413,268 B1 * 7/2002  Hartman ....................... 607/94

* cited by examiner

Primary Examiner—Kiet T. Nguyen
(74) Attorney, Agent, or Firm—Steven C. Bauman

(57) ABSTRACT

A UV spot curing lamp assembly comprises an integral filter support and shutter stop mechanism. The assembly includes a UV lamp and a light guide spaced therefrom for receiving filtered light from the lamp and for directing light through the light guide to a selected target or work site for curing materials thereat. A filter plate in the form of a borosilicate glass, having a selected thickness for the particular application, is disposed in relatively close proximity to the entrance surface of the light guide. A movable shutter plate, having an opening therethrough, is disposed between the filter and the light guide entrance surface. The shutter is movable from a first position wherein the opening is in registry with the light guide entrance surface to receive light from the lamp to a second position wherein a solid portion of the shutter plate blocks light from being received by the light guide entrance surface. Effective cooling of the lamp assembly is provided by a fan by which forced air is drawn over the lamp and the integral filter support and shutter stop, and by an internal mounting system configured to direct the drawn air for effective convective heat dissipation.

42 Claims, 10 Drawing Sheets

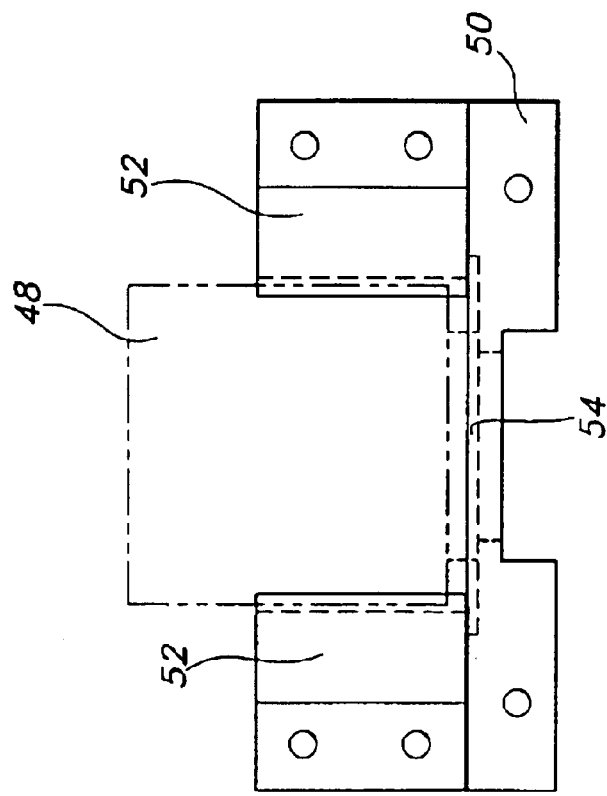
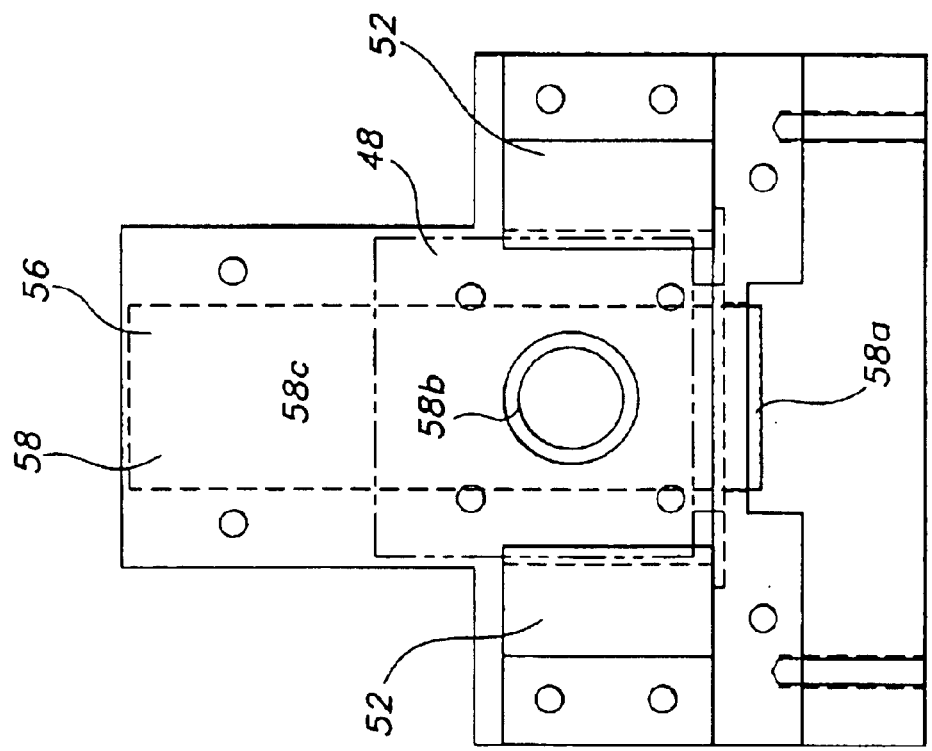
FIG. 4B
FIG. 4A

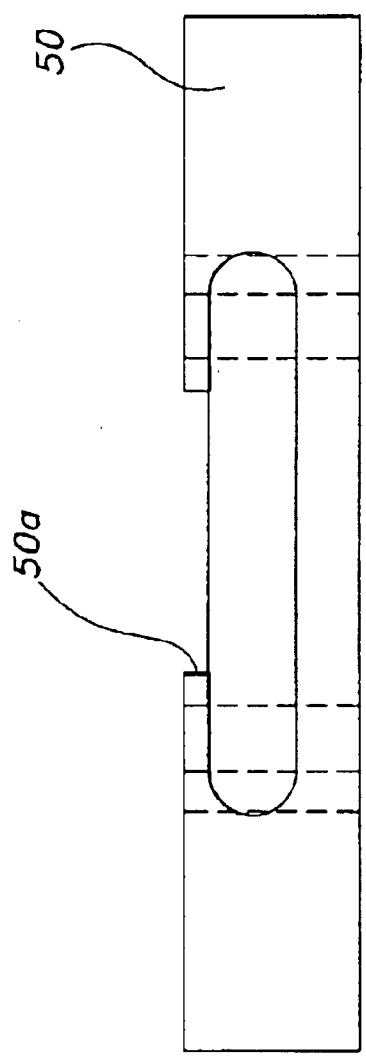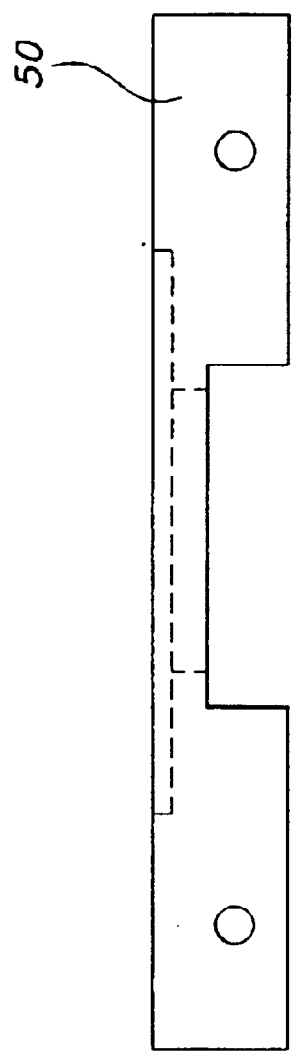
FIG. 5B
FIG. 5A

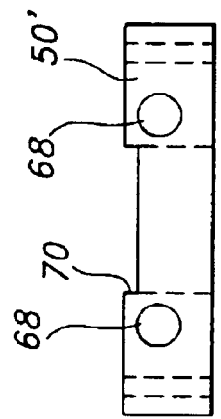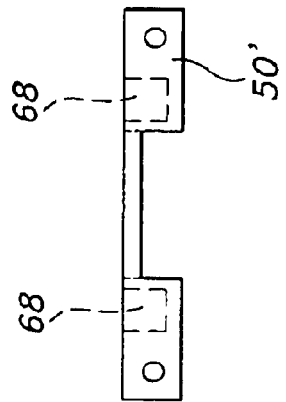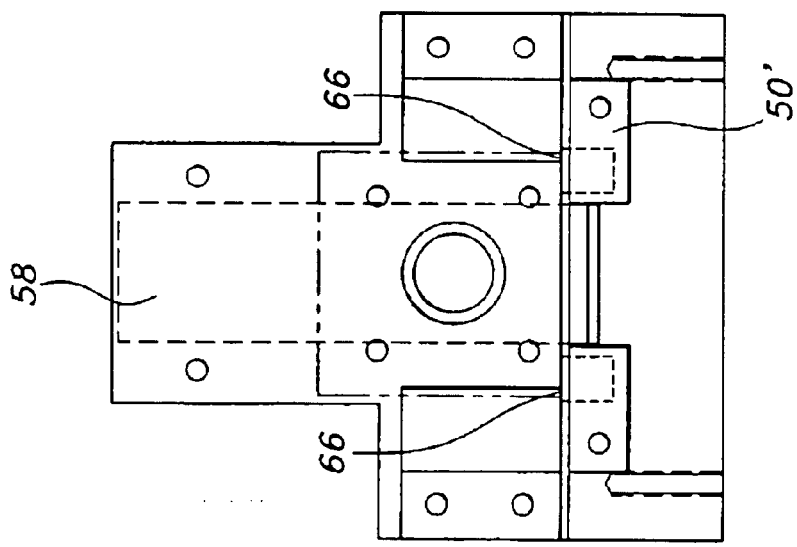

INTEGRAL FILTER SUPPORT AND SHUTTER STOP FOR UV CURING SYSTEM

CROSS-REFERENCE TO RELATED APPLICATION

This application claims priority to Provisional Application Ser. No. 60/272,523, filed on Mar. 1, 2001 and entitled "Integral Filter Support and Shutter Stop for UV Curing System".

FIELD OF THE INVENTION

The present invention relates generally to a UV spot curing system, and more particularly, to a UV curing lamp assembly including a UV lamp, a light guide and an integral filter support and shutter stop for directing focused reflected light to the light guide.

BACKGROUND OF RELATED TECHNOLOGY

It is well known to use ultraviolet (UV) lamps to cure certain curable compounds such as adhesives and the like. UV spot curing systems are used in various applications including the curing of industrial sealants for potting electronics, bonding plastics in the medical industry and the curing of dental filling materials, amongst other applications.

Commercially available spot curing lamp assemblies typically include a UV lamp and a reflector by which reflected light from the lamp is focused to a target at the lamp focal point. In applications where it is necessary to deliver a focused or collimated beam of light to a remote target, the UV curing assembly includes a light guide. The light guide, which may be flexible, has an input end for receiving light from the UV lamp and an output end for directing light to the material on the target to be cured.

One known UV curing lamp assembly, used particularly for dental applications, is the light curing gun disclosed in U.S. Pat. No. 5,803,729. The light gun described therein includes a light source comprising a halogen bulb, a light guide for receiving light from the light source and a reflector for reflecting the light to the light guide. The light gun further includes a conical light concentrator element and a water filled chamber between the light source and the concentrated element. The water increases the collection of light as well as cools the concentrator while filtering out light in the infrared portion of the light spectrum.

Another UV curing lamp assembly is depicted in U.S. Pat. No. 5,521,392. This apparatus comprises a light source for producing light, a light guide for delivering the light produced by the source to a work site, a sensor for detecting the intensity of the light produced by the source, and a controller for determining the amount of light energy to be delivered to the material to be cured at the work site. The apparatus further includes a dimmer for controlling the intensity of the light delivered to the work site and a shutter for controlling the exposure time for the work site.

As may be appreciated by reference to the UV curing systems shown in both the '729 and '392 patents, the assemblies shown therein are relatively complex, including a substantial number of parts which add not only to the cost of manufacture but also the ability to easily use such devices.

As can further be appreciated by the known devices in the art, heat dissipation and efficiency of operation are also factors to be considered in the design and applicability of UV curing systems. While efficiency of the system may be increased by keeping the UV light source on during the operation of the curing system, heat buildup typically results. While the art, such as shown in the '729 patent, recognizes that water cooling may be used to effectively dissipate undesirable heat buildup, this adds to the complexity of the design and cost.

It is therefore desirable to provide a UV curing lamp assembly where the assembly may be more economically and easily manufactured, and further, wherein the assembly may be used efficiently with effective dissipation of heat.

SUMMARY OF THE INVENTION

In accordance with the invention, there is provided a UV-curing lamp assembly, including a cabinet having an enclosure therein and a UV lamp supported within the cabinet enclosure, the UV lamp including a reflector for focusing reflected light from the lamp to a focal point. A light guide, having a light entrance surface, is disposed in the enclosure with the focal point lying substantially at the light entrance surface. The light guide has a light exit surface lying outside the cabinet.

The assembly also includes a shutter/stop mechanism comprising a light guide mounting plate supported by the cabinet. The light guide mounting plate includes a first surface and a second surface spaced therefrom, the light guide being supported by the plate such that the light entrance surface is disposed in close proximity to the first surface of the mounting plate. A filter is supported by the mounting plate for filtering selected light frequencies from the lamp and reducing heat transmission therethrough. The filter is disposed in close proximity to the light entrance surface of the light guide. A shutter/stop member is movably guided by the light guide mounting plate, the shutter/stop member including a first movable portion for blocking light from reaching the light entrance surface, and a second movable portion for allowing light to reach the light entrance surface. The shutter/stop member is disposed in close proximity to the filter.

In one particular form of the present invention, the assembly further comprises a light guide tube supported within the cabinet enclosure. The light guide tube has an opening therein and the light guide is disposed within said opening and supported by the light guide tube.

In another particular arrangement of the present invention, the assembly includes a lamp mounting plate for supporting the UV lamp, in spaced disposition relative to the entrance surface of said light guide which is supported by the light guide mounting plate. A base plate attached to the cabinet further supports both the lamp mounting plate and the light guide mounting plate. A filter support is fixably mounted to the light guide mounting plate for supporting the filter. The filter support further has a recess formed therein for receipt of the shutter/stop member for slidably guiding the shutter/stop member upon movement thereof. The shutter/stop member is suitably connected to a solenoid for selectively moving the member upon activation signals.

In yet a further arrangement of the present invention, the shutter/stop member is disposed between the filter and the light guide mounting plate. The assembly further comprises a fan supported by the cabinet for effective cooling of the cabinet enclosure.

In another aspect of the present invention, an alignment/mounting system in a UV-curing lamp assembly is provided. The lamp assembly is of the type comprising a cabinet housing a UV lamp, the lamp including a reflector for focusing reflected light therefrom to a focal point, and a light guide having a light entrance surface for receipt of said reflected light. The alignment/mounting system includes a lamp mounting plate for mounting the UV lamp thereto, the lamp mounting plate having a lamp opening therethrough through which the reflected light from the lamp passes. A light guide mounting plate spaced from the lamp mounting plate is provided wherein the light guide mounting plate has a light guide opening for supported receipt therein of the light guide. The light guide is supported therein such that the light guide entrance surface is substantially disposed at the lamp focal point. The alignment/mounting system further includes a mounting base for adjustably supporting the lamp mounting plate and the light guide mounting plate relative to each other such that when the light guide is supported by the light guide mounting plate, the entrance surface of the light guide is spaced from the lamp at a distance substantially equal to the distance of the focal point from the lamp.

In yet a further aspect of the present invention, an alignment fixture for use in alignably assembling a UV-curing lamp assembly comprises a generally cylindrical body defining a longitudinal axis, the body including an outer circumferential surface having a first diameter and a length along the axis of extent correlated with a preselected focal depth of the UV lamp. A flange is disposed at one end of the cylindrical body and includes an outer circumferential surface having a second diameter of dimension greater than the first diameter. A pin projects from the other end of the body along the longitudinal axis, the pin including an outer circumferential surface having a third diameter, the third diameter being a dimension less than the first diameter and being substantially concentric therewith.

BRIEF DESCRIPTION OF THE DRAWINGS

FIG. 4(a) is a front elevation view, showing a shutter/stop mechanism of the UV lamp assembly of FIG. 1, including a shutter plate and a filter supported by a filter support.

FIG. 4(b) is a front elevation view of the filter support and filter supported thereby.

FIGS. 5(a) and 5(b) respectively are a front elevation view and a top plan view of the filter support of FIG. 4(a).

FIG. 7(a) is a front elevation view of the shutter/stop mechanism of FIG. 6.

FIGS. 7(b) and 7(c) are respectively a front elevation view and a top plan view of the filter support of FIG. 7(a).

DETAILED DESCRIPTION OF THE INVENTION

Figure 1:
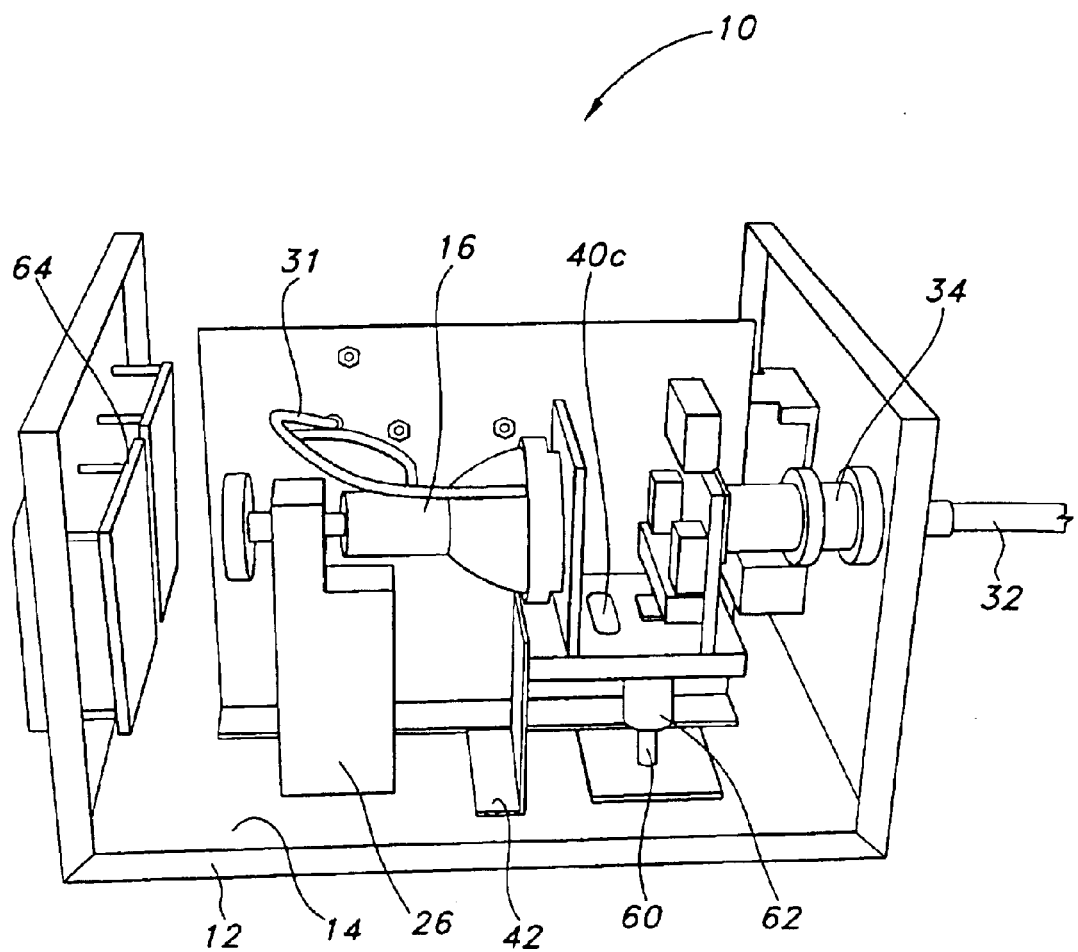
FIG. 1 is a side perspective view of a UV-curing lamp assembly of the present invention with the cabinet cover removed to show the inner components of the assembly.
Figure 2:
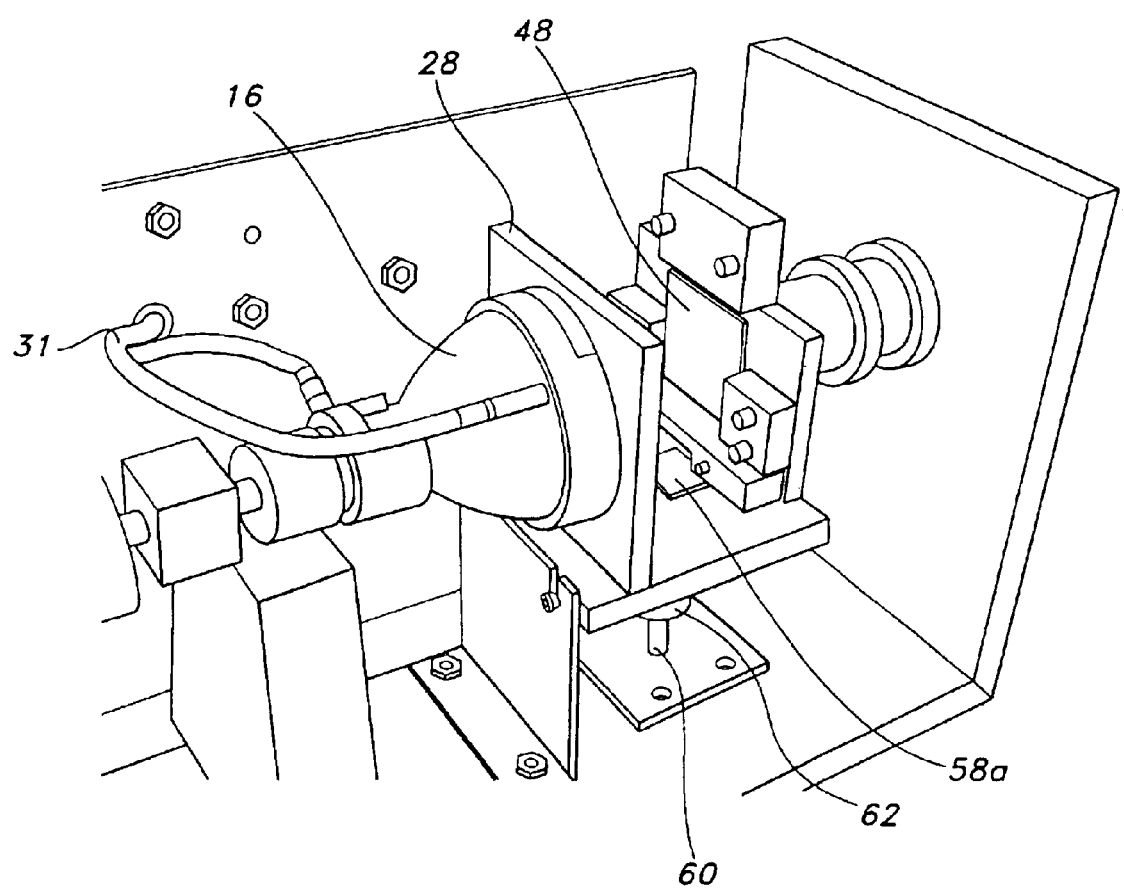
FIG. 2 is a front perspective view of the lamp assembly of FIG. 1, showing details of the assembly shutter/stop mechanism.
Figure 3:
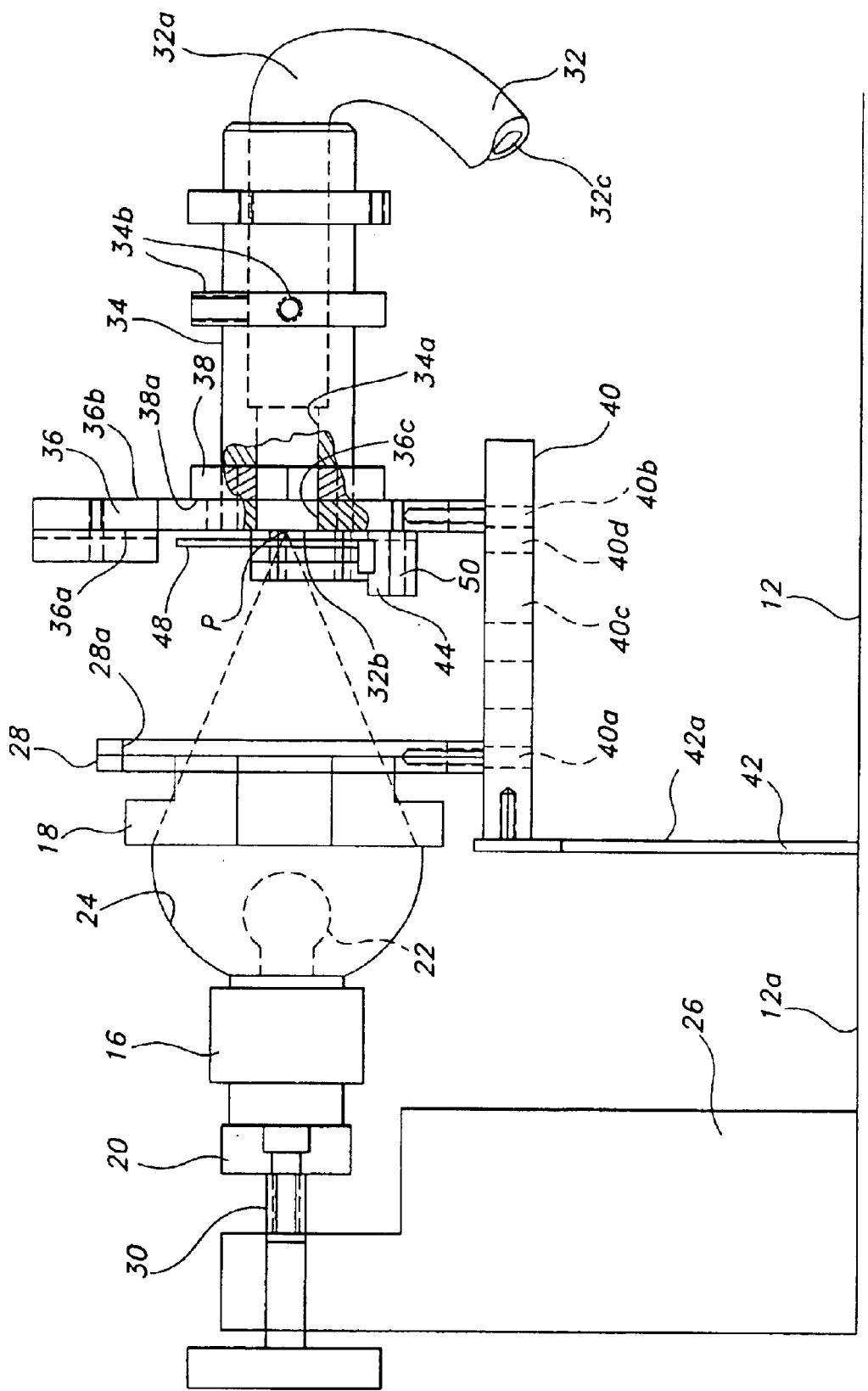
FIG. 3 is a side elevation view of components of the lamp assembly of FIG. 1, showing a UV lamp and a light guide for receipt of light from the UV lamp through a filter.

Referring now to the drawing figures, there is shown in FIGS. 1–3 an ultra violet (UV) lamp curing assembly 10 in accordance with a particular arrangement of the present invention. In its particular arrangement, the lamp assembly 10 of the present invention has specific applicability as a spot curing system for industrial sealants, although it also has useful applicability to cure materials for other purposes.

Lamp assembly 10 comprises a cabinet 12 defining an enclosure 14 therein for suitably housing the lamp assembly components. Cabinet 12 may be formed of sheet metal or other suitable material, and further includes a cover (not shown). A suitable air vent may be provided in either the walls of the cabinet 12 or the cover to facilitate cooling of the lamp assembly as will be described. A UV lamp 16 is suitably housed within cabinet 12 for providing a desired light source. In the preferred arrangement, UV lamp 16 is a conventional straight mercury lamp, although other suitable lamps may be used. Lamp 16 comprises a front mounting frame 18 and a rear mounting frame 20 by which the lamp 16 is supported within the cabinet 12. Lamp 16 includes a light source 22 and a reflector 24 for reflecting light from the light source to a focal point P, the purposes of which will be described hereinafter.

Supported by the cabinet floor 12a at the rear of the lamp 16 is a mounting block 26 by which the rear end of the lamp 16 is suitably supported. The front end of the lamp 16 is suitably mounted by attaching the front frame 18 to a lamp mounting plate 28. A suitable spring, such as a coil spring 30, may be used between the mounting block 26 and the rear frame 20 of the lamp 16 to provide a spring bias to the lamp 16 through which the front frame 18 is pressed securely against the lamp mounting plate 28. Suitable electrical power is provided to the lamp 16 through cables 32.

Lamp mounting plate 28 has an opening 28a formed therethrough through which focused light from the reflector 24 passes to a focal point P. The focal depth D of the lamp 16 extends from the reflector 24 to the focal point P. In the particular application being described, lamp 16 is chosen such that the focal depth D is 45 millimeters, although it should be appreciated that other lamps having different focal depths may also be used within the context of the invention.

The lamp assembly 10 further comprises a light guide 32 supported by a light guide tube 34. The light guide tube 34 is suitably mounted on a light guide mounting plate 36. Light guide 32, which may be glass, optical fiber or any other suitable light transmissive material, has an outer insulative jacket 32a. Light guide tube 34 is of generally cylindrical configuration having a generally cylindrical opening 34a for supportable receipt of the light guide 32 therein. Light guide tube 34 is formed of aluminum although other materials may be used. The light guide 32 may be secured in the light guide tube 34 by screws (not shown) affixed thereto through threaded openings 34b. The front end of the light guide tube 34 includes a front flange 38 defining a front substantially flat face 38a through which opening 34a extends. Light guide 32 includes a light entrance surface 32b which projects axially beyond the front face 38a of the light guide tube flange 38. Light guide 32 also includes a light exit surface 32c which projects exteriorally of the cabinet 12, and which may be directed to a work site or target which contains material to be light cured.

Light guide mounting plate 36 includes a front first surface 36a and an opposing rear surface 36b, first surface 36a and second surface 36b being generally planar and spaced in substantially parallel disposition to each other. Formed through first surface 36a and second surface 36b is an opening 36c for receipt therein of the projecting end of the light guide 32. In the particular arrangement being described, the light entrance surface 32b is disposed to lie substantially in the plane of the first surface 36a of the light guide mounting plate 36. The light guide mounting plate 36 is further arranged to be spaced from the lamp mounting plate 28 such that the focal point P lies substantially at the light entrance surface 32b in the plane of the first surface 36a.

A mounting base 40 supports the lamp mounting plate 28 and the light guide mounting plate 36 in spaced substantially parallel disposition. Base 40 is attached to the lamp mounting plate 28 and to the light guide mounting plate 36 by suitable screws through threaded openings 40a and 40b. It is desirable to apply a chemical locking adhesive, for example, LOCTITE222, to the threads of the screws to prevent loosening and subsequent misalignment between the lamp and the light guide. An opening 40c is formed through mounting base 40 for purposes of facilitating cooling, as will be described.

A mounting bracket 42 is secured to the cabinet floor 12a and to the mounting base 40. The mounting bracket 42 is disposed within the cabinet enclosure 14 in generally close proximity to the front end of the lamp 16, bracket 42 having a surface 42a for directing air flow toward the front end of the lamp for coolant purposes, as will be described.

By further reference to FIGS. 4(a) and 4(b), a shutter/stop mechanism 44, affixed to the first surface 36a of light guide mounting plate 36, is described. A filter 48, preferably in the form of a flat plate, is supported by a filter support 50, which is secured by screws to the light guide mounting plate 36. The filter plate 48 is held at its side edges by brackets 52 and at its bottom edge by a support bar 54. Brackets 52 and support bar 54 may be formed of teflon. The filter plate 48 is supported by the filter support 50 spaced from, but in relatively close proximity to, the first surface 36a of the light guide mounting plate 36, as seen in FIG. 3.

In its preferred configuration, filter plate is selected to be a borosilicate glass, having a thickness of approximately 1.1 millimeters. The filter material is selected to filter out undesirable light frequencies and allows desirable ultraviolet light to pass therethrough. Since not all the UV light is absorbed, heat buildup is minimized. In the arrangement being described, UV light frequencies below about 320 nm are filtered out by the borosilicate glass filter. It has been determined that, for this particular application, the filter thickness of 1.1 mm is a desirable compromise between allowing some, but not all, UV energy between 250 nm to 320 nm to pass and preventing some, but not all, IR energy from passing. It should be appreciated that other filter materials and sizes may be used, depending upon the particular application.

Referring still to FIG. 4(a), a shutter/stop member 56 is shown. The shutter/stop member 56 comprises a shutter plate 58, which is substantially planar and is preferably made of aluminum. Plate 58 includes a bottom portion 58a projecting at a substantially right angle from the plane of shutter plate 58. Shutter plate 58 includes an opening 58b therethrough of generally circular configuration. Shutter plate 58 is supported by filter support 50 for slidable movement relative to the support 50 in a recess 50a, as shown in FIG. 5(b).

In assembly to the light guide mounting plate 36, the shutter plate 58 is disposed between the filter 48 and the first surface 36a of the light guide mounting plate 36, in close proximity thereto, and in substantially parallel relationship with the filter plate 48 and the first surface 36a. Plate 58 is movable in the recess 50a of the filter support 50 from a first position wherein a solid portion 58c (FIG. 4(a)) covers the light entrance surface 32b of light guide 32 to a second position wherein the shutter plate opening 58b is in registry with the light entrance surface 32b thereby allowing light to pass through the opening 58b to the light entrance surface 32b.

By reference again to FIG. 2, the mechanism for movement of the shutter plate 58 is described. The projecting plate bottom portion 58a of the shutter plate 58 is suitably coupled to a piston 60 of a solenoid 62 through an opening 40d in base mounting plate 40. Upon appropriate signals, the solenoid is activated and the piston 60 moves the shutter plate 58 from the first position wherein the solid plate portion 58c covers the light guide entrance surface 32b, thereby preventing light from the lamp 16 from reaching the entrance surface 32b to the second position wherein the shutter plate opening 50b is in registry with light guide entrance surface 32b, thereby allowing light from lamp 16 to pass through opening 58b to the light entrance surface 32b.

It should be appreciated that, during operation, the lamp assembly 10 operates more efficiently when the light source 22 in lamp 16 is kept on. Because undesirable heat can build up and deleteriously affect the operation of the assembly, a fan 64 is provided for cooling purposes. In the preferred arrangement, the fan 64 is a 24 volt fan (43 cfm rated) arranged to draw air through the enclosure 14. Drawn air is directed by surface 42a of bracket 42 to cause air to flow over the front end of the lamp 16 at the reflector thereof. Drawn air is also caused to flow through the opening 40c in base mounting plate 40 between the lamp mounting plate 28 and the light guide mounting plate 36. Additionally, even though the filter plate 48 and the shutter plate 58 are disposed in close proximity to the first surface 36a of the light guide mounting plate 36, sufficient spacing is provided to allow drawn air to flow over the filter plate. 48 and shutter plate 58 to provide further heat dissipation.

Figure 6:
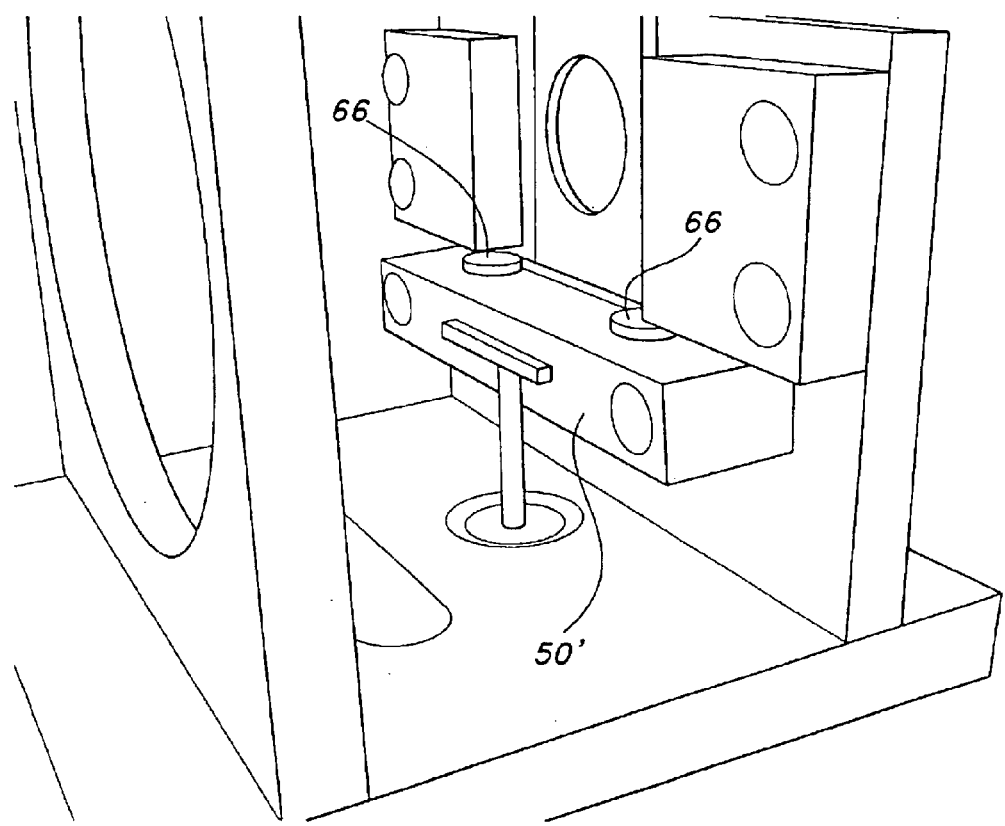
FIG. 6 is a front perspective view of a preferred arrangement of the shutter/stop mechanism.

To further increase the convective heat dissipation, the filter support may be formed as shown in FIGS. 6 and 7(a). Instead of using a teflon support bar 54, as shown in FIG. 4b, for holding the bottom edge of the filter plate 48, a pair of spaced teflon bushings 66 may be provided in the filter support 50' to support the lower corners of the filter plate 58. As such, most of the bottom edge of the filter plate 48 is spaced from the upper surface of the filter support 50', thereby allowing forced air to flow under the filter plate 48 and between the shutter plate 58 and the first surface 36a of the light guide mounting plate 36. As further seen in FIGS. 7(b) and 7(c), the filter support 50' includes a pair of bores 68 for suitably receiving the teflon bushings 66. A recess 70 is further provided for slidable receipt of the shutter bar 58.

Figure 8:
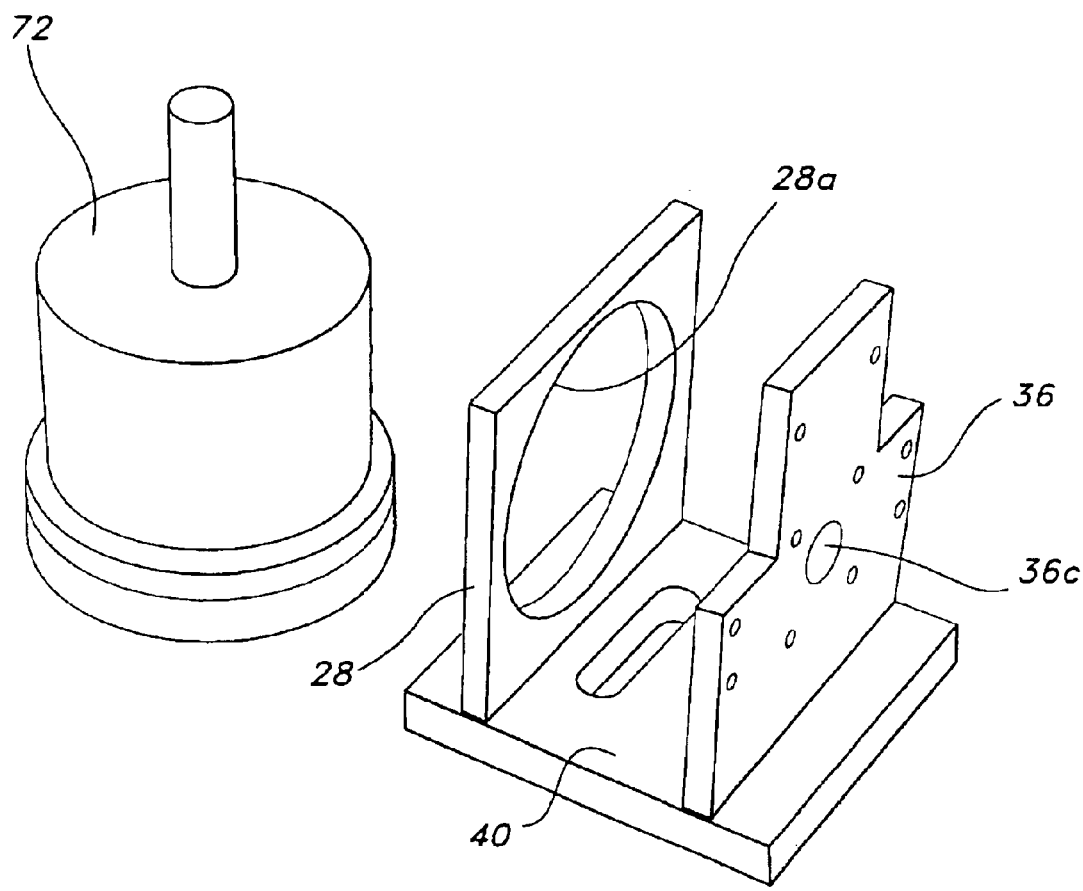
FIG. 8 is a top perspective view, showing in partial disassembled disposition, an alignment/mounting system for use with a UV-curing lamp assembly.
Figure 9B:
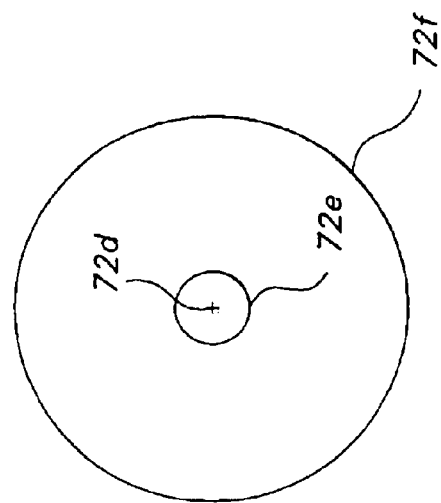
FIGS. 9(a) and 9(b) are respectively a side elevation view and from elevation view of the alignment fixture of FIG. 8.
Figure 9A:
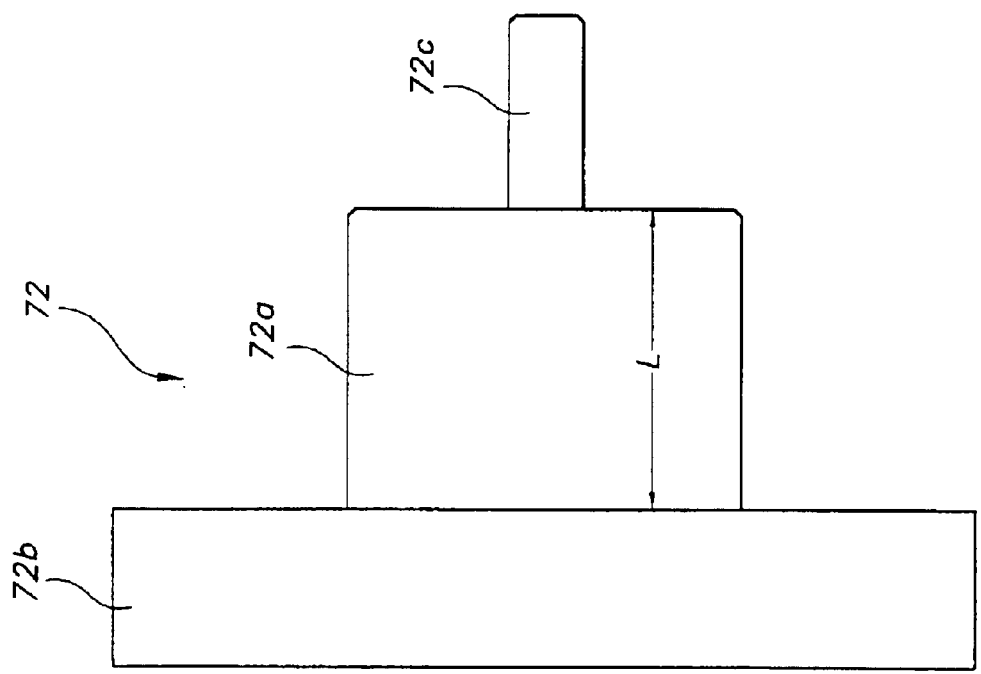

Referring now to FIG. 8, the alignment/mounting system of the present invention is described. The mounting system comprises the lamp mounting plate 28, the light guide mounting plate 36 and the base mounting plate 40. The base 40 fixedly supports the lamp mounting plate 28 and the light guide mounting plate 36 as described hereinabove. The lamp mounting plate 28 and the light guide mounting plate 36 are supported by the base 40 in a manner such that the lamp mounting plate opening 28a and the light guide mounting plate opening 36c are concentrically aligned relative to each other. The alignment is effected by an alignment fixture 72, the details of which are also illustrated in FIGS. 9(a) and 9(b).

Alignment fixture 72, which is formed of stainless steel but may also be of other suitable material, comprises a generally cylindrical body 72a, a flange 72b disposed at one end of the cylindrical body 72a, and a pin 72c projecting axially outward from the cylindrical body 72a along the longitudinal axis 72d of the fixture 72. The diameter 72a of the alignment fixture 72 is configured to be slightly smaller but very closely dimensioned to the diameter of the opening 28a of lamp mounting plate 28. The projecting pin 72c has a diameter that is slightly smaller than, but is very closely dimensioned to the diameter of the opening 36c of light guide mounting plate 36. Additionally, the outer circumference 72e of the pin 72c and the outer circumference 72d of the cylindrical body 72a are designed to be substantially concentric. Flange 72b has an outer circumferential surface that has a diameter larger than the circumferential surface 72d of the cylindrical body 72a. The cylindrical body 72a has a length L that is correlated to the focal depth D of the lamp.

Figure 10:
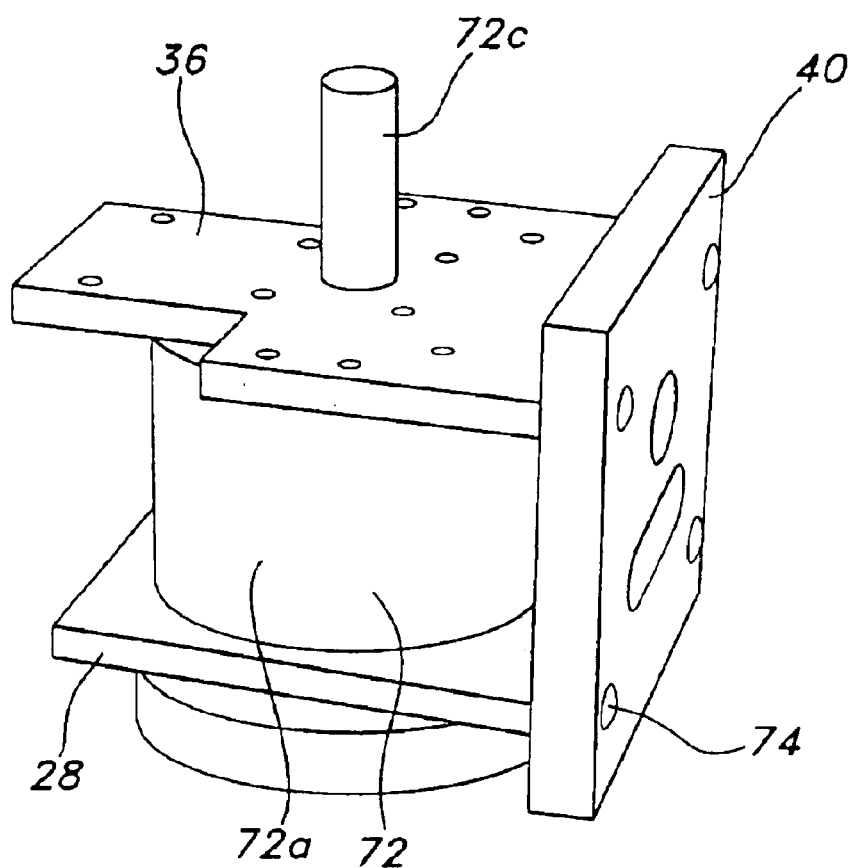
FIG. 10 is a perspective view, showing in combination, the alignment/mounting system of FIG. 8.

Referring now to FIG. 10, the alignment fixture 72c is shown in preassembly with the lamp mounting plate 28, the light guide mounting plate 36 and the base 40. The cylindrical body 72a extends through the lamp plate opening 28a, and the pin 72c extends through the opening 36a of the light guide mounting plate 36. Lamp mounting plate 28 rests against the flange 72b while light guide mounting plate 36 rests against the cylindrical body 72a. The base 40 is formed to be attached to the lamp mounting plate 28 and the light guide mounting plate 36 by suitable screws. For example, in one particular arrangement, the screws may be 6–32 screws, or any other screw size suitable for the desired applications. In this particular arrangement, the through openings in the mounting base 40 through which the screws 74 extend are formed to have a clearance opening that will allow the base plate 40 to adjustably move relative to the lamp mounting plate 28 and the light guide mounting plate 36. By means of such adjustability, the lamp mounting plate 28 and the light guide mounting plate 36 are effectively spaced apart by the fixture dimensions, while the concentricity of the plate openings 28a and 36c are similarly provided by the concentric dimensions of the fixture 72. The screws 74 are suitably tightened once the lamp mounting plate 28 and the light guide mounting plate 36 are appropriately seated on the mounting fixture 72. Because the length L of the cylindrical body 72a is correlated to the focal depth D of the lamp 16, once assembled on the fixture 72, the lamp mounting plate 28 and the light guide mounting plate 36 are suitably spaced such that the lamp focal point P will be in the plane of the first surface 36a of the light guide mounting surface. After the screws 74 are tightened, the alignment fixture 72 is removed from the assembled plate, thereby resulting in a mounting system that is desirable aligned.

The devices and the system of the present invention can be used in conjunction with a variety of different photocurable adhesive compositions. For example, UV curable vinyl and (meth)acrylate-containing compositions, which may also be optionally anaerobically curable, may be employed. Such compositions may include urethane-acrylate copolymers and block copolymers such as those disclosed in U.S. Pat. Nos. 3,425,988; 4,295,909; and 4,309,526. Other useful photocurable compositions containing reactive (meth)acrylate components are disclosed in U.S. Pat. Nos. 4,415,604; 4,424,252; and 4,451,523, all to Loctite Corporation.

Photoinitiators which are intended to be active primarily in the ultraviolet (UV) region are incorporated along with the curable component, and which upon exposure to sufficient ultraviolet light initiate photopolymerization of the curable component. Such UV compositions can be used as structural adhesives, potting compounds, gap filling compounds, sealing compounds, conformal coatings as well as other applications known to those skilled in the art.

In addition to the aforementioned adhesive compositions, UV curable silicone compositions are also contemplated as being useful with the present invention. Such compositions contain a curable silicone component and a UV photoinitiator component. Additionally, cyanoacrylate adhesives designed to cure upon exposure to photoirradiation may also be employed.

Examples of commercially available UV curing compositions include Loctite product numbers Adhesive 352, 3321, 3491, 3525 and 3201.

It should now be appreciated that the UV-curing lamp assembly, as described herein in accordance with the preferred embodiments, is relatively simple to manufacture, easy to use and has minimal moving parts, particularly as the result of the integrated filter/shutter mechanism and mounting arrangement. Further, the UV lamps may be kept on during the entire time of operation as a result of the effective dissipation of heat by means of the forced air drawn through the assembly cabinet and the mounting arrangement of the components therewithin.

Having described the preferred embodiments herein, it should be further appreciated that various modifications may be made thereto without departing from the contemplated scope of the invention. As such, the preferred embodiments described herein are intended in an illustrative rather than a limiting sense. The true scope of the invention is set forth in the claims appended hereto.

What is claimed is:

1. A UV-curing lamp assembly comprising:
   a cabinet having an enclosure therein;
   a UV lamp supported within said cabinet enclosure, said UV lamp including a reflector for focusing reflected light from said lamp to a focal point;
   a light guide having a light entrance surface disposed in said enclosure with said focal point lying substantially at said light entrance surface, said light guide having a light exit surface lying outside said cabinet; and
   a shutter/stop mechanism, including:
   a light guide mounting plate supported by said cabinet, said light guide mounting plate including a first surface and a second surface spaced therefrom, said light guide being supported by said plate such that said light entrance surface is disposed in close proximity to said first surface of said mounting plate;
   a filter supported by said mounting plate for filtering selected light frequencies from said lamp and reducing heat transmission therethrough, said filter being disposed in close proximity to said light entrance surface of said light guide; and
   a shutter/stop member movably guided by said plate and including a first movable portion f or blocking light from reaching said light entrance surface and a second movable portion for allowing light to reach said light entrance surface, said shutter/stop member being disposed in close proximity to said filter.

2. A lamp assembly according to claim 1, wherein said assembly further comprises a light guide tube supported within said cabinet enclosure and having an opening therein, said light guide being disposed within said opening and supported by said light guide tube.

3. A lamp assembly according to claim 2, wherein said light guide tube includes & front face through which said opening extends, said front face being mounted on said plate at said second surface thereof.

4. A lamp assembly according to claim 3, wherein said mounting plate has an opening therethrough extending through said first and second surfaces thereof, and wherein said mounting plate first and second surfaces are generally planar, said light guide entrance surface projecting beyond the front face of said light guide tube and into said mounting plate opening.

5. A lamp assembly according to claim 4, wherein said shutter/stop member comprises a substantially flat shutter plate supported for movement generally parallel to said mounting plate first surface.

6. A lamp assembly according to claim 5, wherein the first portion of said shutter/stop member is defined by a solid portion of said shutter plate and said second portion is defined by an opening through said shutter plate, said shutter plate opening being arranged no be moved in registration with said entrance surface of said light guide upon movement of said shutter plate parallel to said mounting plate first surface.

7. A lamp assembly according to claim 6, wherein said assembly further comprises a piston connected to said shutter plate and supported by said cabinet, said piston being suitably connected to a solenoid for selectively moving said shutter plate upon activation signals.

8. A lamp assembly according to claim 6, wherein said filter comprises a generally flat plate of glass selected to pass UV light at desired frequencies, said filter plate being disposed in generally parallel disposition relative to said shutter plate aria fixed relative to said mounting plate.

9. A lamp assembly according to claim 8, wherein said shutter/stop member comprises a filter support fixedly mounted to said light guide mounting plate and supporting said filter.

10. A lamp assembly according to claim 9, wherein said filter support has a recess formed therein for receipt of said shutter plate therein for slidably guiding said shutter plate upon movement thereof.

11. A lamp assembly according claim 8, wherein said shutter plate is disposed between said filter plate and the first surface of said mounting plate.

12. A lamp assembly according to claim 8, wherein said assembly further comprised a base plate supporting said mounting plate, said base plate being supported by said cabinet.

13. A lamp assembly according to claim 12, wherein said assembly further comprises a lamp mounting plate, said lamp mounting plate being supported by said base plate and being spaced from said light guide mounting plate.

14. A lamp assembly according to claim 13, wherein said assembly further comprises a an supported by said cabinet.

15. A lamp assembly according to claim 14, wherein said assembly further comprises a bracket supported by said cabinet and having a surface for directing air flow over said UV lamp.

16. A lamp according to claim 14, wherein said base plate has an air flow opening therethrough, said opening being situated between said light guide mounting plate and said lamp mounting plate f or directing air flow therebetween.

17. A lamp assembly according to claim 14, wherein said filter support comprises a filter support bracket for holding said filter plate in a spaced position relative to said filter support so as to facilitate the air flow around said filter plate.

18. A UV-curing lamp assembly, comprising: a UV lamp supported by a cabinet within an enclosure, said UV lamp including a reflector for focusing reflected light from said lamp to a focal point;
 a light guide tube supported by said cabinet within said enclosure and having an opening therein;
 a light guide disposed in the opening of said light guide tube, said light guide having a light entrance surface disposed in a plane substantially including said focal point and a light exit surface disposed exteriorly of said cabinet;
 a filter disposed between said lamp and said light entrance surface of said light guide for filtering selected light frequencies and reducing heat transmission therethrough; and
 a shutter/stop mechanism movably supported within said enclosures, said shutter/stop mechanism having a first portion movably disposed to block light from said lamp from reaching said light entrance surface of said light guide and a second portion movably disposed to allow light from said lamp to pass through said filter to said light entrance surface of said light guide, said shutter/stop mechanism being disposed in relatively close proximity to said filter and said light entrance surface of said light guide 19. A lamp assembly according to claim 18, wherein said assembly further includes a light guide mounting plate supported by said cabinet, said light guide mounting plate including a first generally planar surf ace and a second generally planar surface spaced therefrom, said light guide tube being supported by said light guide mounting plate such that said light guide entrance surf ace is disposed in close proximity to said first surface of said mounting plate.

20. A lamp assembly according to claim 19, wherein said light guide tube has an opening therein, said light guide being disposed within said opening and supported by said light guide tube.

21. A lamp assembly according to claim 19, wherein said light guide tube includes a front face through which said opening extends, said front face being mounted on said plate at said second surface thereof.

22. A lamp assembly according to claim 21, wherein said mounting plate has an opening therethrough extending through said first and second surfaces thereof, said light guide entrance surface projecting beyond the front face of said light guide tube and into said mounting plate opening.

23. A lamp assembly according to claim 19, wherein said shutter/stop mechanism comprises a substantially flat shutter plate supported for movement generally parallel to said mounting plate first surface.

24. A lamp assembly according to claim 23, wherein the first portion of said shutter/stop mechanism is defined by a solid portion of said shutter plate and said second portion is defined by an opening through said shutter plate, said shutter plate opening being arranged to be moved in registration with said entrance surface of said light guide upon movement of said shutter plate parallel to said mounting plate first surface.

25. A lamp assembly according to claim 24, wherein said assembly further comprises a piston connected to said shutter plate and supported by said cabinet, said piston being suitably connected to a solenoid for selectively moving said shutter plate upon activation signals.

26. A lamp assembly according to claim 24, wherein said filter comprises a generally flat plate of glass selected to pass UV light at desired frequencies, said filter plate being disposed in generally parallel disposition relative to said shutter plate and fixed relative to said mounting plate.

27. A lamp assembly according to claim 26, wherein said shutter/stop mechanism comprises a filter support tiredly mounted to said light guide mounting plate and supporting said filter.

28. A lamp assembly according to claim 27, wherein said filter support has a recess formed therein for receipt of said shutter plate therein for slidably guiding said shutter plate upon movement thereof.

29. A lamp assembly according to claim 26, wherein said shutter plate is disposed between said filter plate and the first surface of said mounting plate.

30. A lamp assembly according to claim 26, wherein said assembly further comprises a base plate supporting said mounting plate, said baseplate being supported by said cabinet.

31. A lamp assembly according to claim 30, wherein said assembly further comprises a lamp mounting plate, said lamp mounting plate being supported by said base plate and being spaced from said light guide mounting plate.

32. A lamp assembly according to claim 31, wherein said assembly further comprises a fan supported by said cabinet.

33. A lamp assembly according to claim 32, wherein said assembly further comprises a bracket supported by said cabinet and having a surface for directing air flow over said UV lamp.

34. A lamp according to claim 32, wherein said base plate has an air flow opening therethrough, said opening being situated between said light guide mounting plate and said lamp mounting plate for directing air flow therebetween.

35. A lamp assembly according to claim 32, wherein said filter support comprises a filter support bracket for holding said filter plate in a spaced relation relative to said filter support so as to facilitate the air flow around said filter plate.

36. In a UV-curing lamp assembly comprising a cabinet housing a UV lamp, said UV lamp including a reflector for focusing reflected light therefrom to a focal point, and a light guide having a light entrance surface for receipt of said reflected light, wherein an improvement comprises an alignment/mounting system comprising:

a lamp mounting plate for mounting said UV lamp thereto, said lamp mounting plate having a lamp opening therethrough, through which said reflected light from said lamp passes;

a light guide mounting plate spaced from said lamp mounting plate, said light guide mounting plate having a light guide opening for supported receipt therein of said light guide, said light guide being supported therein such that said light guide entrance surface is substantially at the lamp focal point; and a mounting base for adjustably supporting said lamp mounting plate and said light guide mounting plate relative to each other such that when said light guide is supported by said light guide mounting plate, the entrance surface of said light guide is spaced from said lamp at a distance substantially equal to the distance of said focal point from said lamp.

37. An alignment/mounting system according to claim 36, wherein said light guide mounting plate comprises a first generally planar surface facing said lamp mounting plate and a second generally planar surface spaced from said first surface, said light guide opening extending through said first and second surfaces.

38. An alignment/mounting system according to claim 37, wherein said light entrance surface of said light guide lies substantially in a plane defined by said first surface.

39. An alignment/mounting system according to claim 38, further comprising a light guide tube, said tube having an opening for supported receipt of said light guide therein, said light guide tube being mounted to said light guide mounting plate at the second surface thereof.

40. An alignment/mounting system according to claim 39, wherein said lamp mounting plate, and said light guide mounting plate are mounted to said mounting base by screws, and wherein said base has screw receiving holes of sufficient expanse for receiving said screws therein to allow movable adjustability in securing said lamp mounting plate and said light guide mounting plate to said mounting bass.

41. An alignment fixture for use in alignably assembling a IN-curing lamp assembly, comprising:

a generally cylindrical body defining a longitudinal axis, said body including an outer circumferential surface having a first diameter, and a length along said axis of extent correlated with a preselected focal depth of said UV lamp;

a flange at one end of said body and including an outer circumferential surface having a second diameter of dimension greater than said first diameter; and a pin projecting from said other end of said body along the longitudinal axis, said pin including an outer circumferential surface having a third diameter, said third diameter being of dimension less than said first diameter and being substantially concentric therewith.

42. In combination with the alignment fixture of claim 41, a lamp mounting plate having a substantially circular lamp opening therethrough, said lamp opening being slightly larger than said body first diameter, said lamp mounting plate residing on a fixture body and against said flange, a light guide mounting plate having a substantially circular light guide opening therethrough, said light guide opening being slightly larger than said pin diameter, said light guide plate residing on a fixture pin and against said other end of said body; and a mounting base adjustably assembling said lamp mounting plate and said light guide mounting plate with a predetermined spacing therebetween, said fixture being removable from said lamp mounting plate and said light guide mounting plate after assembly to said mounting base.

* * * * *